United States Patent [19]

Kashioka et al.

[11] 4,091,394
[45] May 23, 1978

[54] PATTERN POSITION DETECTING SYSTEM

[75] Inventors: Seiji Kashioka, Hachioji; Masakazu Ejiri, Tokorozawa; Michihiro Mese; Takafumi Miyatake, both of Hachioji; Toshimitsu Hamada, Tokyo; Isamu Yamazaki, Tachikawa, all of Japan

[73] Assignee: Hitachi, Ltd., Japan

[21] Appl. No.: 762,717

[22] Filed: Jan. 26, 1977

[30] Foreign Application Priority Data

Jan. 26, 1976 Japan .................................. 51-6671

[51] Int. Cl.² .............................................. G06K 9/04
[52] U.S. Cl. ...................... 340/146.3 H; 340/146.3 Q
[58] Field of Search ................. 340/146.3 B, 146.3 Q, 340/146.3 H, 146.3 AH

[56] References Cited

U.S. PATENT DOCUMENTS

| | | | |
|---|---|---|---|
| 3,189,873 | 6/1965 | Rabinow | 340/146.3 H |
| 3,503,043 | 3/1970 | Brass | 340/146.3 AH |
| 3,522,437 | 8/1970 | Bargh | 340/146.3 H |
| 3,693,154 | 9/1972 | Kubo et al. | 340/146.3 H |
| 3,748,644 | 7/1973 | Tisdale | 340/146.3 Q |
| 3,801,957 | 4/1974 | Hogan | 340/146.3 Q |
| 3,873,974 | 3/1975 | Bouton et al. | 340/146.3 B |
| 3,898,617 | 8/1975 | Kashioka et al. | 340/146.3 H |
| 4,014,000 | 3/1977 | Uno et al. | 340/146.3 Q |

*Primary Examiner*—Leo H. Boudreau
*Attorney, Agent, or Firm*—Craig & Antonelli

[57] ABSTRACT

A pattern position detecting system comprising first means to sequentially fetch local images in a two-dimensionally arrayed form from a video signal in accordance with the scanning of an image and at sampling intervals which are variably instructed independently in the vertical and horizontal directions, second means to hold two-dimensional patterns having the same array as the local images, third means to evaluate the degree of non-coincidence between the image of the first means and the pattern of the second means, fourth means to store the position of an image scanning point at the time when the degree of non-coincidence becomes the minimum in a predetermined range within a picture frame, fifth means to calculate the position of an object from the position obtained by the fourth means, and sixth means to store the vertical and horizontal sampling intervals necessary for the operation of the first means, the two-dimensional patterns for use in the second means and numerical values necessary for the positional calculation of the fifth means, and to select required ones and send them to the first, second and fifth means.

7 Claims, 20 Drawing Figures

PATTERN POSITION DETECTING SYSTEM

BACKGROUND OF THE INVENTION

1. Field of the Invention

This invention relates to a position detecting system in which a predetermined pattern in an image is searched for and its position is detected.

2. Description of the Prior Art

As a system wherein a certain specific pattern is distinguished from other patterns and a background pattern and sampled from within a two-dimensional image picked up by an imaging device, such as television camera, and its position in the two-dimensional image is evaluated, there has heretofore been known one wherein local patterns of an object are stored as standard patterns, the standard patterns and segmented patterns of predetermined size at various positions in the image inputted by the imaging device are sequentially compared with each other, and the best coincident coordinate position is detected, thereby to detect the position of the whole object.

In this case, the segmented pattern is sampled at a fixed sampling interval corresponding to the interval of sampling points of the standard pattern, and it is compared with the standard pattern.

Accordingly, the pattern detecting accuracy is determined by the sampling interval. When the sampling interval is therefore made small in order to enhance the detection accuracy more, a smaller pattern need be used as the standard pattern. It occurs that such standard pattern cannot become a pattern having a feature, and it substantially becomes difficult to detect the position of the specific pattern.

In short, the prior-art system described above has the disadvantage that the detection accuracy is determined by the size of the local standard pattern having the feature on the object and that it becomes extremely poor in some cases.

SUMMARY OF THE INVENTION

The first object of this invention is to provide a pattern position detecting system which has a satisfactory detection accuracy independent of the size of a standard pattern having a feature.

The second object of this invention is to provide a pattern position detecting system which can recognize the positions of multifarious objects.

In order to accomplish such objects, this invention provides a pattern position detecting system comprising first means to selectively instruct desired sampling intervals, second means to generate sampling pulses having the sampling interval from said first means, third means to sample a video signal by the pulses of said second means and to generate a local image pattern sampled by the sampling interval, fourth means to hold standard patterns having features, fifth means to evaluate a degree of coincidence between the standard pattern of said fourth means and the local image pattern of said third means, and sixth means to find the position of the local image pattern as judged to be the greatest in the degree of coincidence by said fifth means, whereby the sampling interval can be set in conformity with the size of the standard pattern.

DETAILED DESCRIPTION OF THE PRIOR ART

Figure 1A:
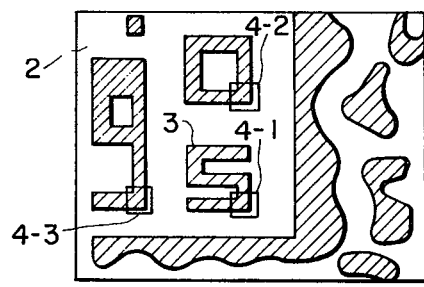
FIGS. 1a, 1b and 1c are pattern diagrams for explaining a prior-art position detecting system.
Figure 1B:

In a position detecting system, the position of the whole object 2 is detected in such a way that, for example, a pattern 3 resembling a standard pattern shown in FIG. 1b is detected from within an image 1 picked up as shown in FIG. 1a, to indicate the position of the pattern 3.

The position detecting system of this sort is used for the wire bonding of an LSI (Large Scale Integration), an IC (Integrated Circuit), a transistor etc. A specific pattern on the image 1 obtained by picking up the image of a chip surface is searched for by the use of the standard pattern 3, and the position of the specific pattern is sensed. Thus, the position of the object 2 is detected, and the wire bonding can be carrier out at a specific position.

At this time, assuming that the standard pattern in FIG. 1b consists of, for example, 10 × 10 sampling points, the image frame in FIG. 1a is examined at a predetermined sampling interval corresponding thereto.

Figure 1C:

Accordingly, the detecting accuracy of the pattern position becomes proportional to the sampling interval. When, in order to enhance the detecting accuracy, the sampling interval is shortened to, for example, one-third, a pattern in FIG. 1c which also consists of 10 × 10 sampling points need be made the standard pattern. In case of examining the entire picture frame of FIG. 1a with such a pattern, however, not only the corresponding part 4-1 but also parts 4-2 and 4-3 are coincident with the standard pattern of FIG. 1c, and hence, it becomes difficult to detect only the position of the desired part 4-1. This is attributed to the fact that the pattern of FIG. 1c has no distinctive feature as a pattern.

In general, it is often the case that the existence of a pattern which is sufficiently small and which also has a distinctive feature on an object cannot be expected. Under such situation, the detecting accuracy becomes inferior to a large extent.

DETAILED DESCRIPTION OF THE PREFERRED EMBODIMENTS

Before describing the embodiments of this invention, the principle of this invention will be explained.

As stated above, the characterizing feature of this invention resides in the fact that the sampling interval can be variably set in conformity with the size of a standard pattern.

Here, an image input device which performs the raster scanning and which is represented by a television camera is considered as an imaging device for the explanation. It converts video information within a selected field of view into signals arrayed in time. The sampling on an image is replaced with the sampling of video signals in time. In order to vary the sampling interval on the image, there are two methods.

Figure 2A:
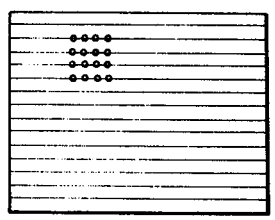
FIGS. 2a and 2b and FIGS. 3a and 3b are picture frame diagrams for explaining the principle of a position detecting system of this invention.
Figure 2B:
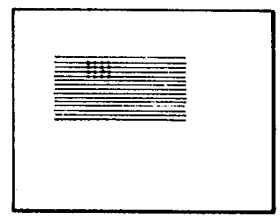

The first method varies the scanning width of the imaging device with the period of scanning and the time interval of sampling fixed. Standard scanning lines are supposed as shown in FIG. 2a. Assuming by way of example that the horizontal scanning width is reduced to one-half and the vertical scanning width to one-third, scanning lines as shown in FIG. 2b are obtained for the frame of the identical image. Accordingly, the spacial sampling interval can be varied. In order to perform this method, the amplitudes of the deflecting signals of the imaging device may be controlled. It is easy to independently vary the gains in the horizontal deflection and the vertical deflection, and it is also possible to electronically effect the switching with high speed. On account of the characteristics of the imaging device, however, when the scanning lines are altered in this manner, the property of the video signals is sometimes changed, and the imaging device must be redesigned.

Figure 3B:
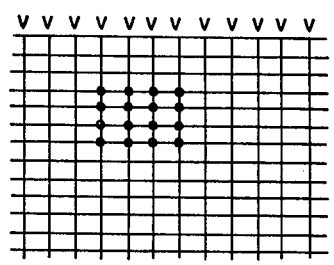
Figure 3A:
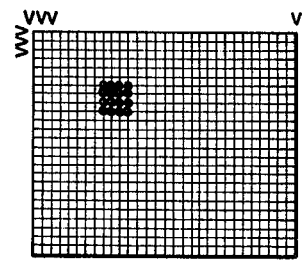

The second method for varying the sampling interval varies the time sampling interval of the video signals with the scanning period and deflection amplitude of the imaging device fixed. Lateral lines of checkers shown in FIG. 3a indicate scanning lines as they are, while vertical lines are drawn at intervals equal to scanning line intervals. A lattice point forms the base of the sampling point at the time when the image is sampled and processed, and it is called a picture element. Marks O in FIG. 3a exemplify a standard pattern of 4 × 4 dots. FIG. 3b illustrates sampling points in the case where the sampling interval in the horizontal direction is made three times greater and where the sampling interval in the vertical direction is made two times greater, by points between lattices of thick lines, and further illustrates the size of the standard pattern of 4 × 4 dots.

By changing the sampling intervals in this way, the size of the standard pattern can be selected to a suitable one even if the number of points constituting the standard pattern is fixed. Such a system is applicable to the position detection of multifarious objects. It is effective, for example, when various objects are successively supplied by a belt conveyor and they are discriminated and located, when the positions of objects at respective fields of view are detected by arranging a large number of imaging devices in parallel and using a single image processor in time division, etc. At this time, the sizes of local standard patterns may be changed-over at high speed in conformity with the feature patterns of the individual objects, and the sampling intervals may be varied accordingly.

As to an embodiment of this invention for enhancing the detecting accuracy by the use of the foregoing principle, the operating principle will now be described with reference to FIGS. 4, 5, 6 and 7a–7c.

The characterizing feature of this embodiment is that the detection of a position is divided into two stages providing for rough detection and minute detection.

Figure 4:
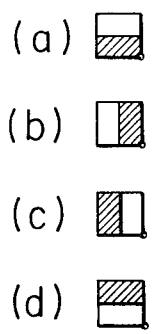
FIG. 4, FIG. 5, FIG. 6 and FIGS. 7a to 7c are pattern diagrams for explaining an embodiment of the position detecting system of this invention.
Figure 5:
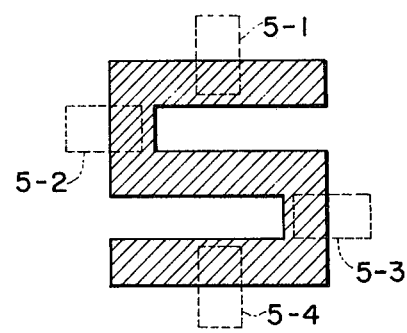
Figure 6:
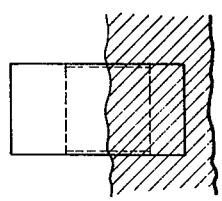

In the rough detection, a standard pattern having a size sufficient to ensure the inclusion of a distinguishing feature of a pattern in a picture frame is used. In the example of the object 2 as shown in FIG. 1a, the feature is secured by the standard pattern of the size illustrated in FIG. 1b. Let it be supposed that the sampling intervals at this time correspond to six picture elements in both the vertical and horizontal directions. Then, in the rough detection, the whole picture frame is sampled at intervals of six picture elements vertically and horizontally and is inputted, segmented two-dimensional patterns having the same size as that of the standard pattern are successively compared with the standard pattern, and the best coincident coordinate position is found. This position involves an error up to six picture elements at the maximum. In order to obtain a more precise position, minute detection is subsequently carried out. In the above, the segmented two-dimensional patterns may well be obtained by inputting the image of the whole picture frame at the ordinary intervals of one picture element and sampling the inputted image at the intervals of six picture elements. The minute detection is performed by taking note of an edge line part in the horizontal and vertical directions of a pattern and detecting the position of the edge line in a direction orthogonal to the edge line. At this time, the sampling interval is made one picture element, and four standard patterns shown at (a)–(d) in FIG. 4 are employed. Although the patterns have no feature, any erroneous position is not obtained because the search range is limited with the result of the rough detection. FIG. 5 illustrates the search range in the minute detection. Parts 5-1, 5-2, 5-3 and 5-4 indicate the ranges of segmented patterns to be compared with the standard patterns (a), (b), (c) and (d) in FIG. 4, respectively. Whereas the rough detection makes the search with the extent over the entire picture frame, the minute detection can make the search with the search ranges limited to the rectilinear regions orthogonal to the edge lines. The length of the region shall be made at least double the sampling interval of the rough detection and may be made approximately triple. If the rough detection has been correctly made, parts substantially coincident with the standard patterns exist within the ranges without fail. Moreover, the degree of coincidence presents a sharp peak within the range. Therefore, the position of the edge line can be detected at an accuracy of substantially one picture element. Even when, as illustrated in FIG. 6, an edge line has some unevenness, it is possible to detect the average boundary thereof.

Figure 7A:
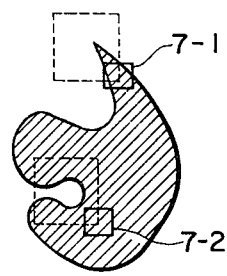
Figure 7B:
Figure 7C:

In case of detecting a pattern which has no edge line either in the vertical direction or in the horizontal direction as illustrated in FIG. 7a, patterns in FIGS. 7b and 7c may be prepared as the standard patterns of the minute detection, and two-dimensional smal sections 7-1 and 7-2 in FIG. 7a may be used as the search ranges of right lower points of the segmented patterns of the minute detection corresponding thereto. With the standard patterns as shown in this example, sharp peaks are presented in both the horizontal and vertical directions at the coincidence, and hence, the necessary location can be conducted.

Figure 8:
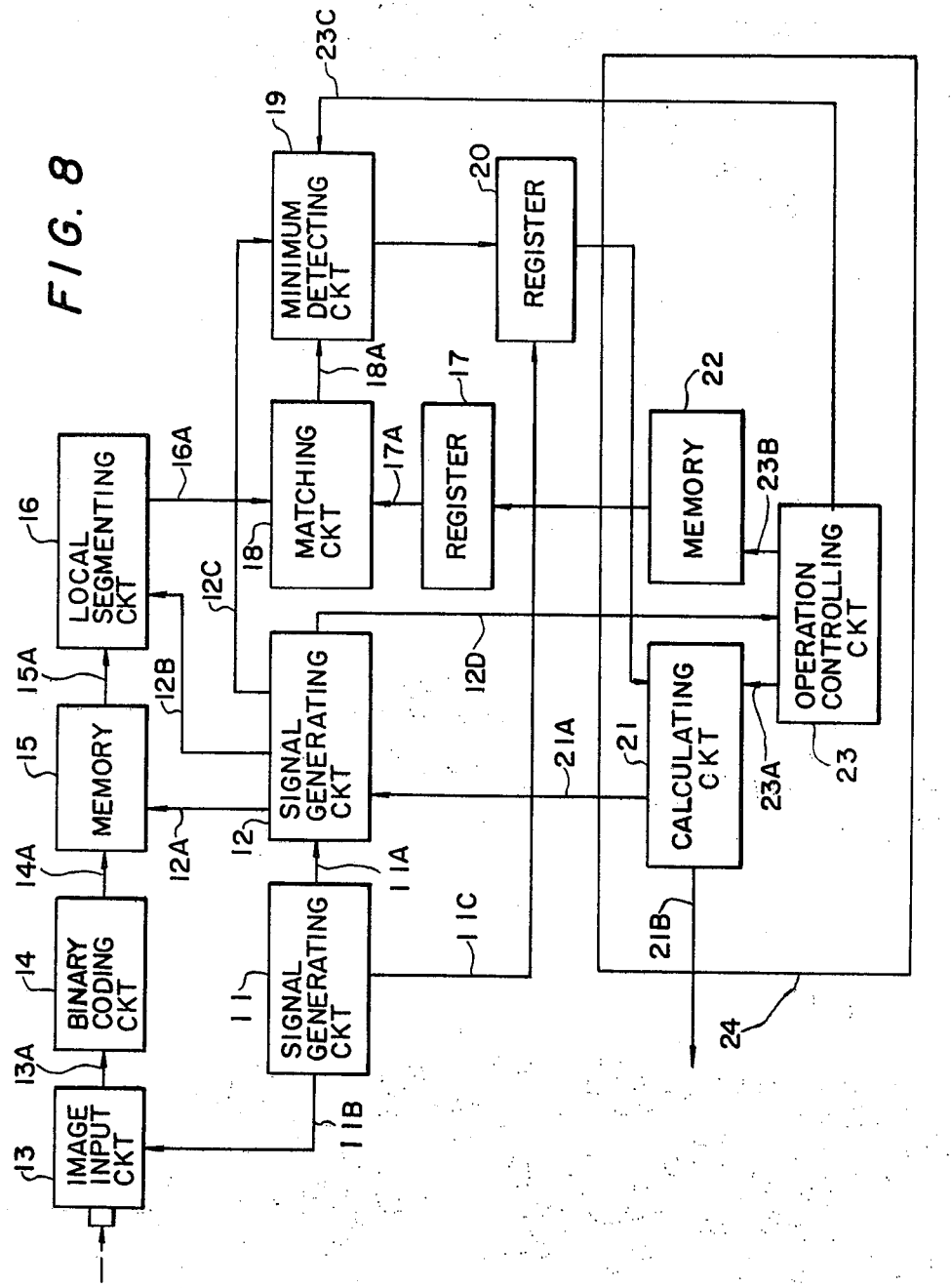
FIG. 8 is a block diagram showing the construction of the embodiment of the position detecting system according to this invention.

FIG. 8 is a diagram which shows an example of the construction of the whole apparatus for realizing the embodiment stated above. Numeral 11 indicates a single generating circuit which generates a scanning point coordinate signal 11A and horizontal and vertical synchronizing signals 11B on the basis of fundamental clocks. Numeral 12 indicates a timing signal generating circuit which prepares timing signals 12A–12D necessary for various parts according to the scanning point coordinate signal 11A and a signal 21A which corresponds to a sampling interval and a search range as designated. Numeral 13 denotes an image input circuit which performs scanning according to the synchronizing signals 11B and which generates a video signal 13A including an object. Shown at 14 is a binary coding circuit which converts the video signal into a black-and-white binary signal 14A. Numeral 15 indicates a memory for a two-dimensional picture, which stores the picture of $(n - 1)$ scanning lines while shifting it. Numeral 16 denotes a local segmenting circuit which consists of $n$ shift registers each having $n'$ bits and which segments a binary signal 15A from the memory 15 as a partial image pattern 16A of $n \times n'$ sampling points. Numeral 17 represents a register which temporarily stores a standard pattern 17A of $n \times n'$ sampling points. Shown at 18 is a matching circuit which compares the patterns from the registers 16 and 17 at the respective corresponding points and which provides a signal 18A indicative of the extent of non-coincidence of the patterns. A minimum detecting circuit 19 observes the value of the signal 18A, and when a value smaller than the retained value appears, it replaces the retained value with the smaller value and it outputs a load signal 19A. A register 20 loads the scanning point coordinates 11C at the time when the signal 19A is being provided. Thus, the value retained when the scanning of the designated range has been terminated represents the minimum value as it is, and the register 20 stores the scanning point coordinate at that time. Shown at 21 is a calculating circuit which calculates coordinates on the basis of the coordinates 20A of the register 20 and a command signal 23A, which gives the generator circuit 12 the signal 21A indicative of the search range and the sampling interval of the pattern, and which outputs a signal 21B indicative of the detection result of the position of the object. A memory 22 stores standard patterns 22A to be set in the register 17, by a required number. Numeral 23 indicates an operation controlling circuit which issues operation commands 23A, 23B etc. for various parts of the system in order and which conducts a sequential control for proceeding to the next stage upon receiving the search completion timing signal 12D. Numeral 24 denotes a processor which includes the devices 21-23. This portion can be easily replaced with a general-purpose arithmetic processor of, for example, an electronic computer, and the replacement increases the flexibility of the whole system. Hereunder, the operation of the embodiment in FIG. 8 will be explained in connection with specific examples shown in FIGS. 9 to 13.

Figure 9:
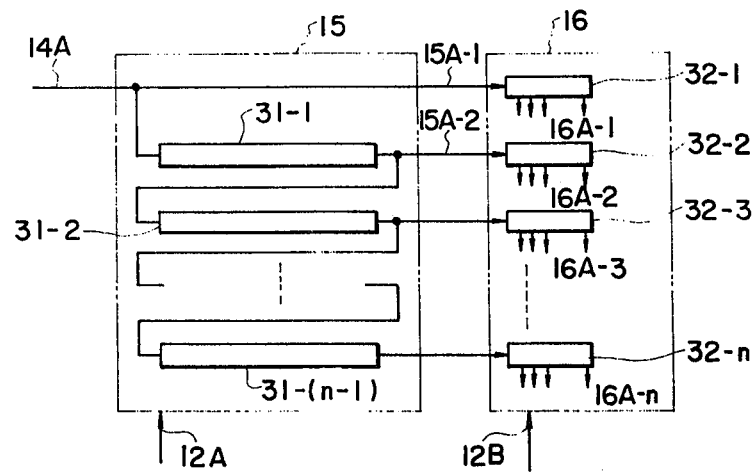
FIGS. 9 to 13 are block diagrams showing examples of the concrete constructions of various parts in FIG. 8.

FIG. 9 shows an example of the image memory 15 and the local segmenting circuit 16 in FIG. 8. The image memory 15 consists of $(n - 1)$ shift registers 31-1, 31-2 ... and 31-$(n - 1)$ connected in cascade. An input of the leading shift register is the output signal 14A of the binary coding circuit 14. The signal 14A is made an input 15A-1 to the local segmenting circuit 16 as it is. Outputs 15A-2, 15A-3 ... and 15A-$n$ of the respective shift registers are also made inputs to the local segmenting circuit 16. Each shift register 31 has a length sufficient to receive the information bits $n'$ corresponding to one scanning line. Accordingly, each signal 15A can have the information of dots vertically arrayed in the picture. The local segmenting circuit 16 is composed of $n$ shift registers 32-1, 32-2 ... and 32-$n$ each having a length of $n'$ bits. The shift register 32 receives the signal 15A as a series input, and sends parallel outputs 16A to the matching circuit 18. The shift registers 31 and 32 thus coupled can be subjected to the controls of the sampling intervals by the clock signals 12A and 12B. In order to control the sampling interval in the vertical direction into $m$ picture elements, the shift clocks 12A and 12B may be provided only at every $m$th scanning lines for both the shift registers 31 and 32. The shift register 31 is endowed with the shift clock 12A at every one picture element at which the sampling is not conducted. In order to control the sampling interval in the lateral direction of the local segmenting circuit into $m'$, the shift clock 12B is given only at every $m'$ picture elements. In this way, the value inputted at the moment of the shift operation is loaded, and the values at the other times are not loaded. Therefore, the sampling is conducted at the entry of the shift register 32, and the pictures loaded at the sampling intervals of $m$ in the vertical direction and $m'$ in the lateral direction appear in the local segmenting circuit 16 in sequence.

Figure 10:
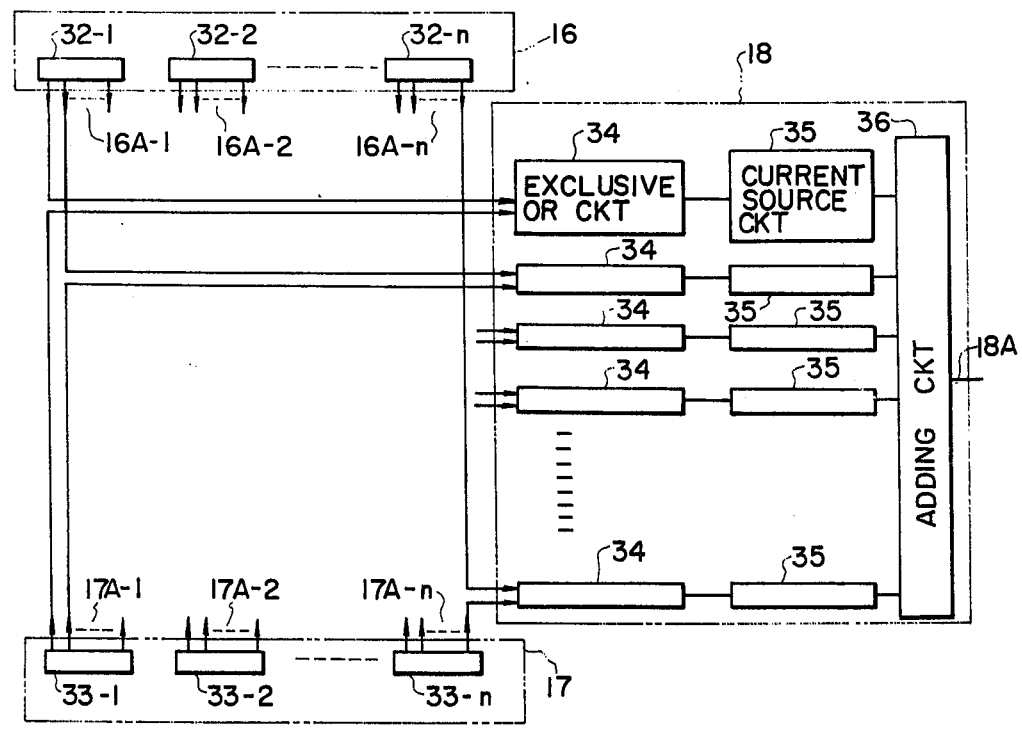

FIG. 10 shows an example of the matching circuit 18 in FIG. 8. The $n'$ parallel outputs 16A of the $n$ shift registers 32-1, 32-2 ... and 32-$n$ of the local segmenting circuit 16 and the outputs 17A of the $n$ shift registers 33-1, 33-2 ... and 33-$n$ each consisting of $n'$ bits in the temporary storage register 17 for the standard patterns form non-coincidence signals by means of exclusive OR circuits 34 at sets of the respectively corresponding signals. The degree of non-coincidence of the whole pattern is expressed by the number of "1" signals among the $n \times n'$ non-coincidence signals. Outputs of current source circuits 35 are turned "on" by the non-coincidence signals, currents are added by an adding circuit 36, and a signal 18A corresponding to the number of the current source circuits held "on" can be obtained. Although, in FIG. 10, the adding circuit 36 is constructed of an analog operating circuit, it may well be constructed of an $n \times n'$ input counter which counts ones inputted at the same time. Such circuit is made a multistage circuit. By way of example, the first stage is constructed of an adder of three inputs and provides an output of 2 bits. At the second stage, the result of the first stage is arranged by an adder of 2 inputs. Thereafter, the stages are similarly advanced, and finally, the addition value of all the first-stage inputs, i.e., the number of the signals "1" can be obtained as a binary number.

Figure 11:
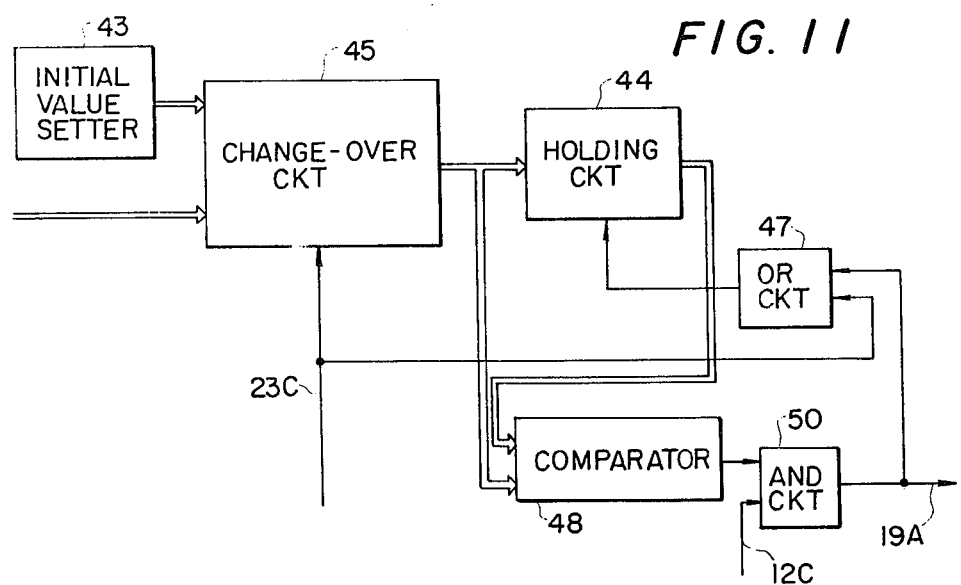

FIG. 11 shows the an example of the minimum detecting circuit 19 in FIG. 8. An initial value setter 43 serves to set a large initial value in a holding circuit 44. When the standard pattern and the search range for the matching have been designated, a change-over circuit 45 is thrown onto an initial value side by the timing signal 23C from the operation controlling circuit 23, and simultaneously, an input gate of the holding circuit 44 is opened through an OR circuit 47 so as to set the initial value of the setter 43. In the search range, the value of the signal 18A of the degree of non-coincidence obtained every moment and the value of the holding circuit 44 are compared by a comparator 48. If it is detected that the value of the new signal 18A is smaller, a signal indicative of the fact is outputted from an AND circuit 50 by the sampling clock 12C and the input gate of the holding circuit 44 is opened through the OR circuit 47 so as to load the value of the new signal 18A. The output 19A and the AND circuit 50 opens also the input gate of the register 20, and a signal 11C representative of X and Y coordinates of the scanning of the scanning point at that time is loaded. Thus, when the scanning of the search range has been terminated, the minimum value remains in the holding circuit 44, and the XY-coordinates at the time of the generation of the minimum value remain in the register 20.

Figure 12:
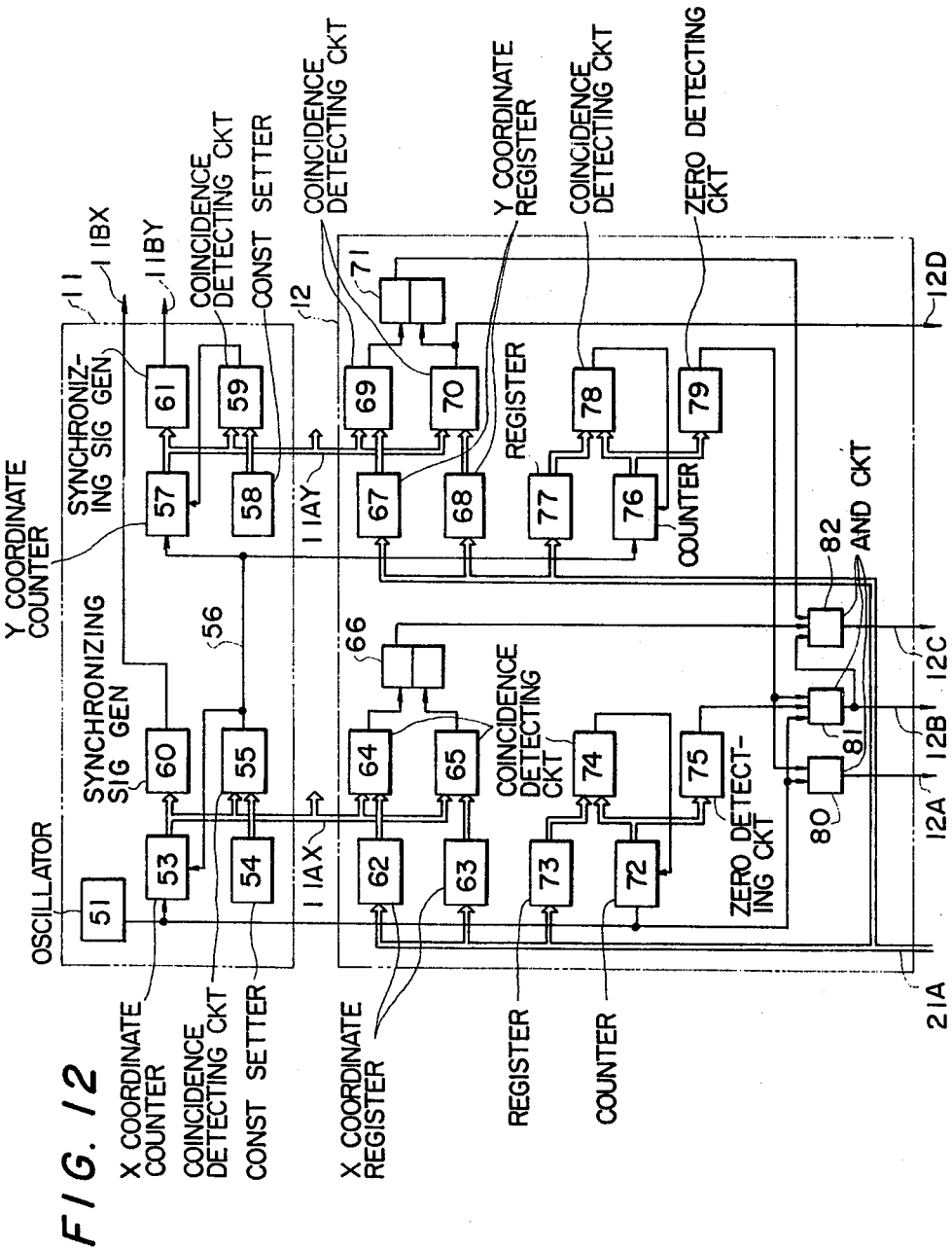

FIG. 12 shows an example of the scanning point coordinate and synchronizing signal generator circuit 11 and the timing signal generator circuit 12 in FIG. 8. In the circuit 11, an X coordinate counter 53 in incremented by output clocks 52 of an oscillator 51. The period of the counter 53 is set in a constant setter 54. When it is detected by a coincidence detecting circuit 55 that the content of the counter 53 has reached the period, the counter 53 is reset. In this way, the counter 53 is reset at the predetermined period. An output 56 of the coincidence detecting circuit 55 is made a clock of a Y coordinate counter 57, and the counter 57 is reset at a predetermined period by the combination of a constant setter 58 for bestowing the period and a coincidence detecting circuit 59. A horizontal synchronizing signal generator 60 and a vertical synchronizing signal generator 61 detect that the contents of the counters 53 and 57 reach certain values, and form horizontal and vertical synchronizing signals 11BX and 11BY having certain timings and widths, respectively.

Now, description will be made of the circuit 12 for limiting the search range. Values of registers 62 and 63 for holding the X coordinates of the left end and the right end of the search range, respectively, are given by the calculating circuit 21 of the operation processor 24. Coincidence detecting circuits 64 and 65 detect the coincidence between the output 11AX of the X coordinate counter 53 of the generator circuit 11 and the contents of the registers 62, 63. A flip-flop 66 is set and reset by the coincidence outputs of the respective coincidence detectors 64 and 65. Accordingly, the flip-flop 66 is "on" only when the X coordinate lies within the designated range. Likewise, as regards the Y coordinate, a flip-flop 71 is set and reset by registers 67 and 68 bestowing the upper and lower ends and coincidence detecting circuits 69 and 70, and a signal which is "on" only in the range if formed.

The circuit for controlling the sampling interval will now be explained. A counter 72 is operated by the same clock 52 as that of the X coordinate counter 53. It is detected by a coincidence detecting circuit 74 that the content of the counter 72 and the content of a period held in a register 73 are coincident. At that time, the counter 72 is reset to return its content to zero. In the counter 73, there is set the signal 21A indicative of the sampling period from the calculating circuit 21. Thus, the counter 72 is reset at every period held in the register 73. A zero detecting circuit 75 detects that the contect of the counter 72 is zero, and its output becomes "on" only during one clock time per period. Likewise, regarding the Y direction, a signal which becomes "on" only for one horizontal scanning line per period is formed by means of a counter 76, a period register 77, a coincidence detecting circuit 78 and a zero detecting circuit 79. AND circuits 80–82 form the necessary timing signals 12A–12C on the basis of these outputs. Clocks are outputted from the AND circuit 80 during a period which corresponds to the width of one horizontal scanning line of the sampling interval designated in the Y direction, and they are used as the shift clocks 12A of the two-dimensional picture memory 15. Further, in the X direction, clocks at every desired sampling interval are outputted from the AND circuit 81, and they are used as the shift clocks 12B of the local segmenting circuit 16. Still further, clocks which limit only the interior of the search range in the X and Y directions are outputted from the AND circuit 82, and they are used as the clocks 12C of the minimum detecting circuit 19. The output of the detector 70 for the lower end of the search range is used as the signal 12D which informs the operation controlling circuit 23 of the operation processor 24 that the scanning of the search range has been completed.

Figure 14:
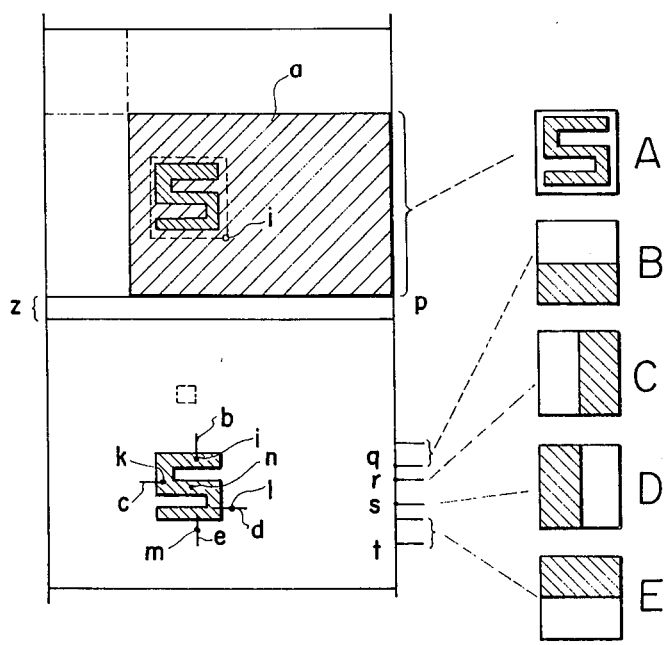
FIG. 14 is a diagram for explaining the operation of the construction in FIG. 13.
Figure 13:
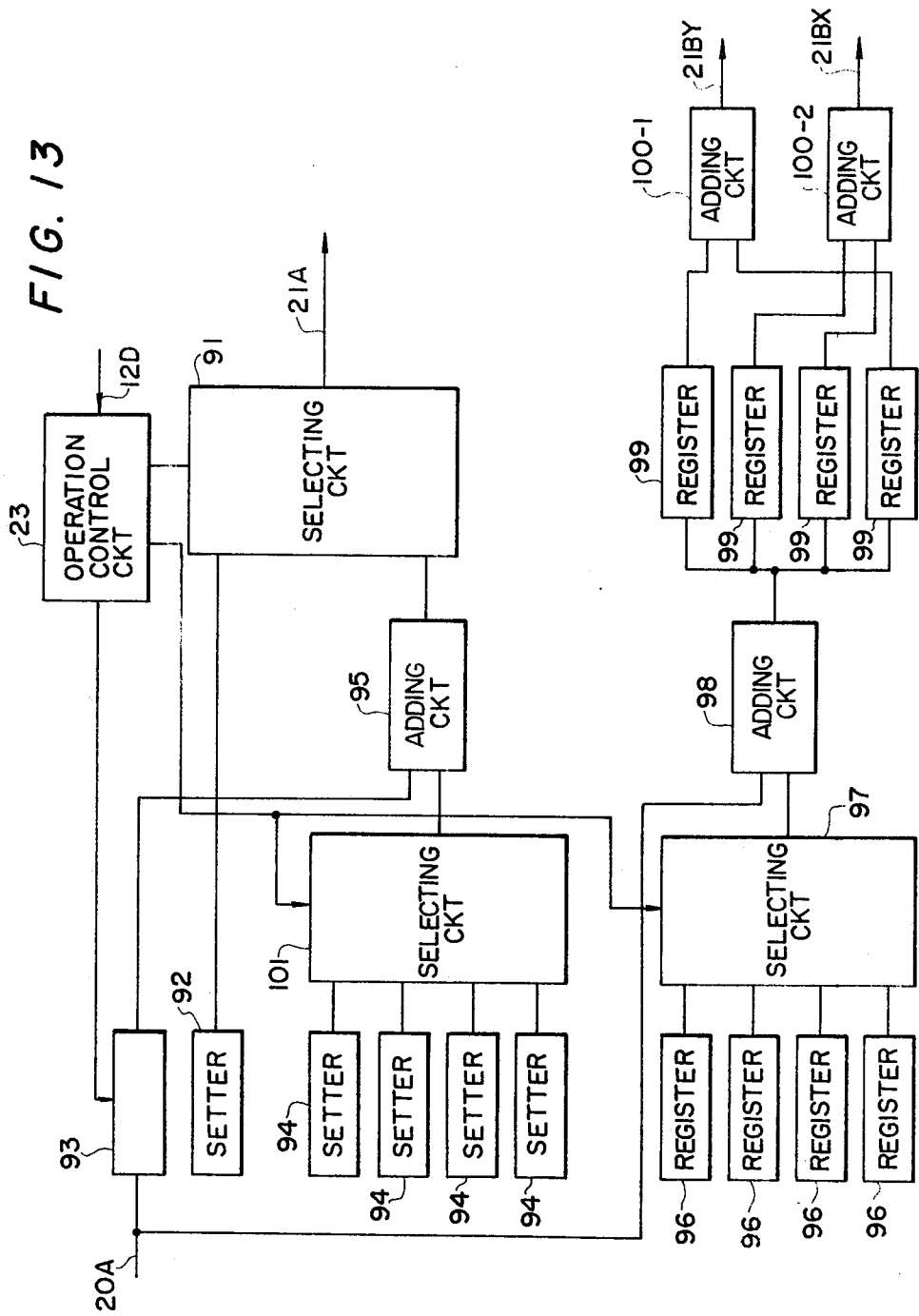

FIG. 13 shows an example of the calculating circuit 21 in FIG. 8. FIG. 14 illustrates how the standard pattern and the search range are changed-over with the proceeding of the scanning under the condition under which the scanning of the picture frame advances downwards as viewed in the figure. Therefore, two picture frames are consecutively shown with a vertical retrace period held therebetween. First, rough recognition is carried out. To this end, the operation controlling circuit 23 changes-over a selecting circuit 91 so as to deliver the search range and the sampling interval for the rough detection from a setter 92. The range is often taken as the whole picture frame, and when a standard pattern A in FIG. 14 is employed, a range $a$ indicated by oblique lines is selected. When the scanning arrives at a point $p$, the search terminates. It is detected that a point $i$ exhibits the minimum degree of non-coincidence, and its coordinate is fed as the signal 20A. This value is stored in the register 93.

Subsequently, the selecting circuit 91 is changed-over to start the minute detection. Using standard patterns B, C, D and E shown in FIG. 14, matchings are executed in rectilinear search ranges $b$, $c$, $d$ and $e$ in FIG. 14, respectively. Since the search ranges have certain relative positional relations to the point $i$ as the result of the rough detection, values stored in a setter 94 for the respective standard patterns are fetched by changing-over a selecting circuit 101, they are added by an adder 95 to the position of the result of the rough detection as held in the register 93, and the sums are fed as the signals 21A through the selector 91. Simultaneously therewith, the selected standard pattern 22A is set from the memory 22 into the register 17 by the command signal 23B from the operation controlling circuit 23. The search ranges $b$, $c$, $d$ and $e$ terminate when points $q$, $r$, $s$ and $t$ are reached, and the search termination signals 12D are generated then. Let it be supposed that, for the standard pattern B, the degree of non-coincidence is the minimum at a point $j$. Since a certain relative positional relation exists between the point $j$ and a position $n$ desired to be finally obtained, values stored in a register 96 for the respective standard patterns are fetched by changing-over a selector circuit 97, they are added by an adder 98 to the positional coordinate of the matching result, and the sums are stored in the corresponding ones of registers 99. When the matchings on the four standard patterns have terminated, the Y coordinates of the register 99 as correspond to the standard patterns A and D are added by an adder 100-1, and a value with the lowest bit removed is taken, whereby the addition mean between both the coordinates is obtained. Likewise, the addition means between the X coordinates is obtained by an adder 100-2 from the results or the standard patterns B and C. The outputs 21BY and 21BX of the adders 100-1 and 100-2 are the coordinates of the point $n$ intended to be finally obtained.

In the foregoing embodiments, description has been made of the example of detecting the position of a certain specific pattern. The detections of the positions of many kinds of specific patterns can also be conducted in such a way that the sampling intervals and the standard patterns are changed-over to required ones and that they are fed to the timing signal generator circuit 12 and the standard pattern register 17 so as to prescribe the matching operations. These controls may be realized by circuits for exclusive uses, or may well be realized by a program by employing a general-purpose processor of the stored program type. According to the latter, the fact that the matching has been correct is easily confirmed by checking the relative positional relations of the matching result positions of a plurality of standard patterns, as a countermeasure at the time when the matchings at the individual standard patterns have been unsuccessful.

Although, in the foregoing embodiments, the video signal has been binary-coded and processed, it is also allowed to convert the video signal into multi-valued digital quantities of a plurality of bits or to process it directly as an analog signal. At this time, the image memory and the matching operating portion may be replaced with devices which have functions similar to those in the foregoing embodiments.

As set forth above, in accordance with this invention, when the standard pattern is selected form within the picture frame set for the detection, the degree of freedom on the size thereof is great, and accordingly, a pattern having a feature is easily selected. Owing to the division of the detection into the stages of rough detection and minute detection, the position of an object can be detected at the resolution of one picture element even in case where the sampling interval of the rough detection is large. In addition, it is possible to detect many kinds of objects with the respectively suitable sizes of the standard patterns and to change-over them highly speedily. These merits lead to rendering wide the applicable scope of the system according to this invention. the system bestows a great degree of freedom, not only on the selection of the kind of the object, but also on the selection of the size of the field of view associated with a supply error of the object within the field of view of the imaging device. On the other hand, the change-overs of all the operations can be electronically effected, so that the positional detections of many kinds of objects to be grasped by a large number of imaging devices can be processed by the time division service.

We claim:

1. A pattern position detecting system comprising image input means to generate a video signal by means of a scanning of an image, first means to selectively designate one of a plurality of desired sampling periods, second means to generate sampling pulses having the sampling period designated by said first means, third means to extract a partial image pattern sampled by said sampling pulses from the video signal generated by said image input means, fourth means for storing standard patterns, fifth means to compare one of the standard patterns from said fourth means and said partial image pattern from said third means and to evaluate the degree of coincidence between them, and sixth means for detecting the position of the partial image pattern on said image at the time when the degree of coincidence is judged to be the greatest by said fifth means.

2. The pattern position detecting system according to claim 1, wherein said first means includes means to selectively designate a range on the image to be extracted as the partial image pattern, and said second means comprises means to generate sampling pulses having the period instructed by said first means during a time interval corresponding to the range designated by said first means.

3. The pattern position detecting system according to claim 2, wherein said third means comprises binary-coding means to encode said video signal from said input means, first memory means for storing the output of said binary-coding means, and second memory means for sampling the output from said first memory means in response to said sampling pulses from said second means and for storing the sampled result.

4. The pattern position detecting system according to claim 1, wherein said fifth means comprises comparison means for generating a signal indicative of the degree of non-coincidence between said partial image pattern from said third means and one of the standard patterns of said fourth means, and detection means for detecting the point at which the non-coincidence signal from said comparison means reaches a minimum value.

5. The pattern position detecting system according to claim 3, wherein said second means comprises first signal generation means to generate synchronizing signals for driving said image input means and coordinate signals indicative of the position on the image being presently scanned by said image input means, by predetermined clocks, and second signal generation means to generate sampling pulses in response to said coordinate signals from said first signal generation means in accordance with said sampling periods designated by said first means.

6. The pattern position detecting system according to claim 2, wherein said first means includes means to designate the range on the image to be extracted and the sampling period in response to the positional signal outputted from said sixth means.

7. A pattern position detecting system comprising image input means for generating video signal by means of the scanning of a picture frame, first means to extract a partial image pattern sampled on the basis of either of first and second sampling periods from the video signal generated by said image input means, second means to selectively hold a plurality of standard patterns, third means to compare the patterns from said first and second means to evaluate the degree of coincidence between them, fourth means for detecting the position of the partial image pattern at the time when the degree of coincidence by said third means is the greatest, and fifth means for designating to said first and third means said second sampling period as well as a positional range on the picture frame of the partial image pattern to be extracted by this period, in response to the position of the partial image pattern at the time when the partial image pattern extracted by said first sampling period is the greatest in the degeee of coincidence with the corresponding standard pattern, and further, to detect the position of a specific pattern in response to the position of the partial image pattern at the time when the partial image pattern extracted by said second sampling period is the greatest in the degree of coincidence with the corresponding standard pattern.

* * * * *